United States Patent [19]

McCord

[11] Patent Number: 4,596,634

[45] Date of Patent: Jun. 24, 1986

[54] VAPOR GENERATING AND RECOVERY APPARATUS INCLUDING CONTINUOUS CONVEYING MEANS THROUGH A VAPOR ZONE

[76] Inventor: James W. McCord, 9101 Nottingham Pkwy., Louisville, Ky. 40222

[21] Appl. No.: 581,544

[22] Filed: Feb. 21, 1984

[51] Int. Cl.⁴ .......................... B01D 3/00; B08B 3/00
[52] U.S. Cl. .................................... 202/170; 202/186; 134/12; 134/104; 134/107; 134/108; 134/109; 134/122 R; 203/87; 203/98; 203/DIG. 4
[58] Field of Search ................ 202/170, 170 D, 186, 202/161; 203/DIG. 16, DIG. 4, 26, 87, 98; 134/12, 31, 32, 11, 10, 15, 37, 104–109, 64 R, 122 R

[56] References Cited

U.S. PATENT DOCUMENTS

| | | | |
|---|---|---|---|
| 3,015,576 | 1/1962 | Hendrixson et al. | 202/170 |
| 3,227,629 | 1/1966 | Kearney et al. | 202/170 |
| 3,656,492 | 4/1972 | Holm et al. | 134/109 |
| 3,866,307 | 2/1975 | Pfahl et al. | 228/249 |
| 3,904,102 | 9/1975 | Chu et al. | 134/31 |
| 4,014,751 | 3/1977 | McCord | 202/170 |
| 4,389,797 | 6/1983 | Spigarelli et al. | 34/73 |

Primary Examiner—Wilbur Bascomb
Attorney, Agent, or Firm—Charles G. Lamb

[57] ABSTRACT

An apparatus for vaporizing a liquid and condensing the vapor includes at least one chamber in which the liquid is vaporized and at least one chamber in which the vapor is condensed. The apparatus has a conveyor inlet channel preferably at one end of the vaporizing chamber, and a conveyor outlet channel preferably at the opposite end of the vaporizing chamber. A conveyor for moving items to be treated through the apparatus extends through the conveyor inlet channel into the vaporizing chamber and out of the vaporizing chamber through the conveyor outlet channel. The apparatus includes a heat emitting device in the vaporizing chamber for vaporizing the liquid therein, and a cooling device in the condensing chamber for condensing the vapor.

16 Claims, 4 Drawing Figures

VAPOR GENERATING AND RECOVERY APPARATUS INCLUDING CONTINUOUS CONVEYING MEANS THROUGH A VAPOR ZONE

BACKGROUND OF THE INVENTION

1. Field of the Invention

This invention relates to a vapor generating and recovering apparatus for vaporizing a liquid and recovering the vapor, and more particularly to a vapor generating and recovery apparatus providing for continuously moving items to be treated therethrough and recovering virtually all of the generated vapor.

2. Description of the Prior Art

Vapor generating and recovery apparatuses are well known for surface treating object. The surface treating can be a cleaning treatment wherein foreign material, such as, for example, oil or wax is removed from the surface of the objects, or a heat emitting treatment for shrink fitting or a heat absorbing treatment for reflowing metals. Regardless of the exact nature of the surface treatment, the objects to be surface treated are, typically, immersed into an approprate treating vapor, and the vapor is recovered for reuse in the treating process.

SUMMARY OF THE INVENTION

The present invention is directed to a vapor generating and recovery apparatus which provides for the continuous movement of objects to be treated through the appratus.

The present invention is further directed to a vapor generating and recovery apparatus for receiving a conveyor therethrough with means to recover substantially all of the vapor generated in the operation of the apparatus.

More particularly, the present invention provides a vapor generating and recovery apparatus comprising means defining at least one vaporizing chamber in which a liquid is vaporized; heat emitting means located in the vaporizing chamber for heating the liquid to a temperature above the vaporizing temperature to create a zone of vapor above the liquid; means defining at least one condensing chamber adjacent to the vaporizing chamber in which the vapor is condensed; cooling means located in the condensing chamber for cooling the vapor to a temperature below the vaporizing temperature; at least one opening in the housing providing conveyor inlet and outlet means; conveyor means extending through the conveyor inlet into the vaporizing chamber, across the vaporizing chamber, and out of the vaporizing chamber through the conveyor outlet; and means defining a path of vapor communication from the vaporizing chamber to the condensing chamber at an elevation above the conveyor means.

BRIEF DESCRIPTION OF THE DRAWINGS

A better understanding of the present invention will be had upon reference to the following description in conjunction with the drawings wherein like numerals refer to like parts and in which.

DETAILED DESCRIPTION

Figure 1:
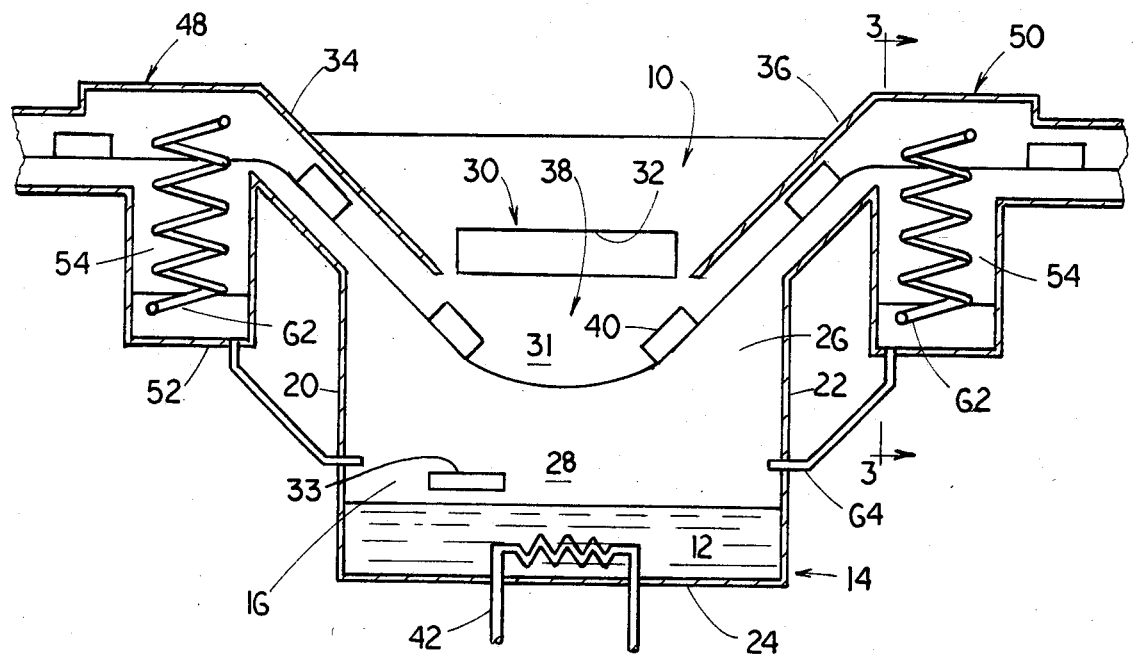
FIG. 1 is a side view in schematic representation, partially broken away, of an advantageous embodiment of a vapor generating and recovery apparatus of the present invention.
Figure 2:
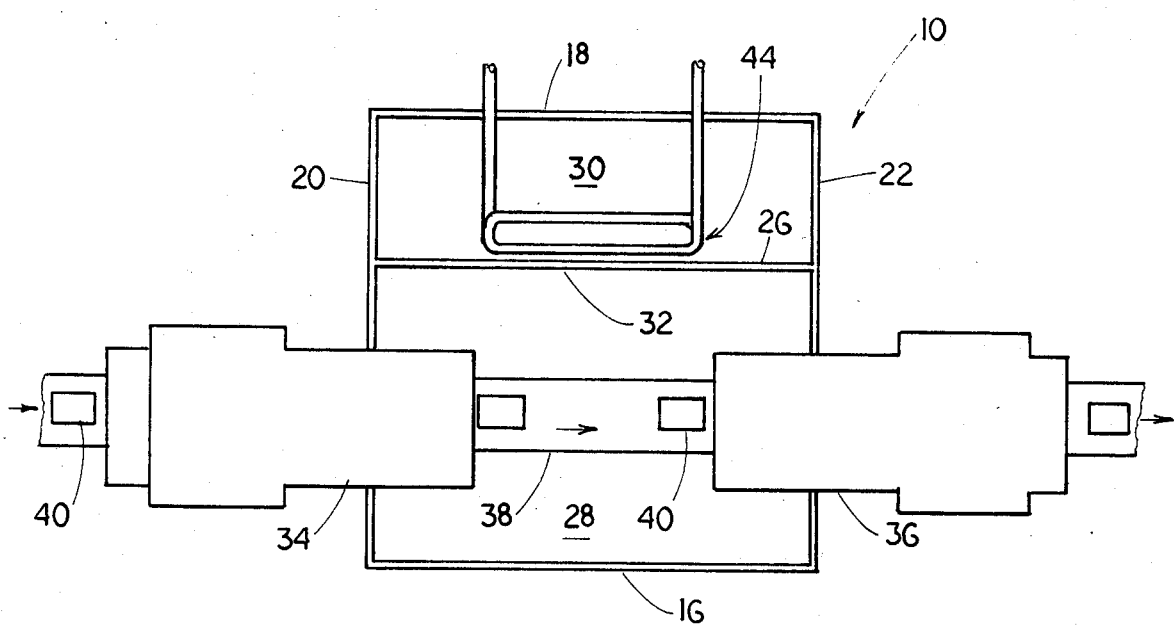
FIG. 2 is a top view of the apparatus of FIG. 1.

With reference to FIGS. 1 and 2, there is shown a vapor generating and recovery apparatus, generally denoted as the numeral 10, for vaporizing and recovering a treating liquid 12. The apparatus 10 can be used, for example, for cleaning objects of oil, grease, wax or particulate matter, or for heat treating an object for shock testing or metal reflow. The examples, however, are only given by way of illustrating some end uses of the apparatus and are not to be considered in any way as limitations of the present invention. The apparatus 10 has virtually endless applications, and the composition of the liquid will, of course, depend upon a particular end use.

The vapor generating and recovery apparatus 10 includes a housing 14 having spaced apart side walls 16 and 18, spaced apart end walls 20 and 22, and a floor 24. A partition wall 26 spans the distance between the end walls 20 and 22 dividing the interior of the housing 10 into at least one vaporizing chamber 28 wherein a treating liquid 12 is vaporized to create a vapor zone 31 above the liquid 12 and at least one condensing chambr 30 wherein the generated vapor 31 is condensed. A path of vapor communication from the vaporizing chamber 28 to the condensing chamber 30 is defined by means of, for example, an aperture 32 formed in the partition wall 26. The partition wall 26 is also provided with means 33 for circulating condensate from the condensing chamber 30 to the vaporizing chamber 28. The recirculation means 33 includes an aperture through the partition wall 26 providing flow-through communication from the condensing chamber 30 to the vaporizing chamber 28. The aperture 32 is located at the upper level of the vapor zone 31 in the vaporizing chamber 28 and functions in the manner of a weir for the flow of vapor from the vaporizing chamber into the condensing chamber 30. The housing 10 also includes conveyor inlet means illustrated as a channel or tunnel 34 located at one end of and open to the vaporizing chamber 28, and conveyor outlet channel means illustrated as a channel or tunnel 36 located at the opposite end of and open to the vaporizing chamber 28. As shown, the inlet and outlet tunnels 34 and 36 are formed by closed ducts which extend into the vaporizing chamber 28.

Conveyor means, such as, for example, an endless belt conveyor device 38 extends through the conveyor inlet tunnel 34 into the vaporizing chamber 28, across the vaporizing chamber 28, and out of the vaporizing chamber 28 through the conveyor outlet tunnel 36. The portion of the conveyor device 38 extending across the vaporizing chamber 28 is disposed at an elevation below the vapor aperture 32 in the partition 26 and, therefore, below the upper level of the vapor zone 31 in the vaporizing chamber 28. The conveyor device 38 is used to continuously move objects 40 through the vaporizing chamber 28 wherein they are surface treated by the vapor 31.

The apparatus 10 further includes heat emitting means 42 located in the vaporizing chamber 26 for heating the treating liquid 12 to a temperature above the vaporizing temperature to create the vapor zone 31 above the liquid 12, and cooling means 44 located in the condensing chamber 30 for cooling the vapor to a temperature below the vaporizing temperature to cause the vapor to condense in the condensing chamber 30. As shown, the heat emitting means 42 comprises at least one heat emitting coil located above the housing floor 24 in the vaporizing chamber 28 and immersed in the treating liquid 12 to be vaporized. As illustrated, the cooling means 44 comprises at least one heat absorbing coil located just below the vapor aperture 32 in the condensing chamber 30. The heat emitting coil 42 and heat absorbing coil 44 can be of virtually any type such as, for example, the heat emitting coil 42 can be an electrically heated coil and the heat absorbing coil 44 can be a water cooled coil. However, it is preferred that the heat emitting coil 42 be a refrigerant condensing coil, and the heat absorbing coil 44 be a refrigerant evaporating coil of a refrigerant system 46, hereinafter discussed.

Figure 3:
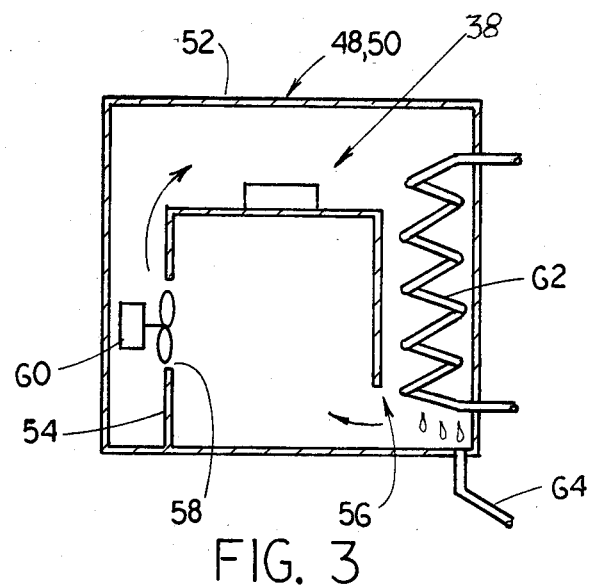
FIG. 3 is an enlarged view of a portion of the apparatus of FIG. 1 as viewed in the direction of arrows 3—3 in FIG. 1; and, FIG. 4 is a schematic of the refrigeration system for the apparatus of the present invention.

With reference to FIGS. 1, 2 and 3, in order to prevent vapor from migrating out of the vaporizing chamber 28 through the conveyor inlet and outlet tunnels 34 and 36, thereby resulting in the loss of liquid and contamination of the ambient atmosphere, a vapor trap means may be provided at one of the openings in the housing for receiving the conveyor device. In a preferred apparatus, vapor trap means are provided at both the conveyor inlet and outlet. In the preferred apparatus, a first vapor trap 48 is provided at the conveyor inlet tunnel 34, and a second vapor trap 50 is provided at the conveyor outlet tunnel 36. With respect to the direction of travel of the conveyor device 38, the first vapor trap 48 is located upstream of the conveyor inlet tunnel 34, and the second vapor trap 50 is located downstream of the conveyor outlet tunnel 36. The vapor traps 48 and 50 are substantially identical, and, therefore, for the sake of brevity only the first vapor trap 48 will be described, it being understood that the description applies equally to the second vapor trap 50. As can be best seen in FIG. 3, the vapor trap 48 comprises an outer compartment 52 open to the conveyor inlet tunnel 34, through which the conveyor 38 traverses, and an inner compartment 54 located within the outer compartment 52 below the path of the conveyor 38 through the outer compartment 52. Vapor or fluid recovery is provided for through the inner compartment 54 and outer compartment 52 by means of, for example, a first aperture 56 formed in the inner compartment 54 defining means to provide fluid flow communication between the inner compartment and outer compartment, and a second aperture 58 in the inner compartment 54 defining means at the opposite side of the inner compartment from the first aperture 56 to provide fluid flow communication between the inner compartment and outer compartment. Fluid circulates across the outer compartment 52, through the first aperture 56, across the inner compartment 54 and through the second aperture 58 by, for example, a fan 60 located at, for example, the second aperture 58. The vapor trap 48 further includes cooling means 62 located in the outer compartment 52 for condensing the vapor entrained in the gas stream circulated by the fan 60. The cooling means 62 cools the vapor to a temperature below its vaporizing temperature causing it to condense in the outer compartment 52. The condensate is returned to the vaporizing chamber 26 from the outer compartment 52 of the vapor trap 48 by means of, for example, a conduit 64 having its open inlet end at the bottom region of the outer compartment 52 and its open outlet end in the vaporizing compartment 26. The cooling means 62 comprises at least one heat absorbing coil located at the first aperture 56 in the inner compartment 54, and it can be of virtually any type, such as, for example, a water cooled coil. However, preferably, the cooling means 62 is a refrigerant evaporator coil of a refrigerant evaporator coil of a refrigerant system 46 hereinafter described.

Figure 4:
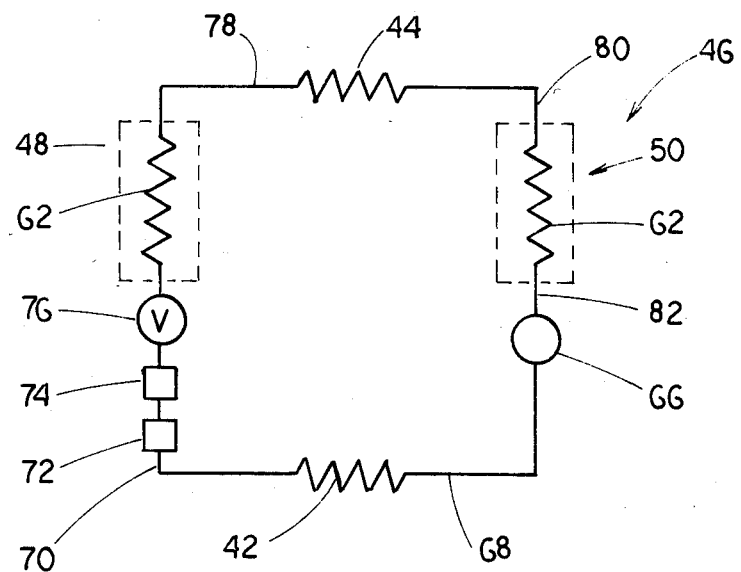

With reference to FIG. 4, there is shown in schematic an example of the refrigerant system 46. The exemplary refrigerant system 46 is illustrated as comprising a refrigerant compressor 66 for compressing a suitable refrigerant. The high pressure side of the refrigerant compressor 66 is in refrigerant flow communication with the refrigerant condensing coil 42 (heat emitting means) through a refrigerant gas conduit 68. The refrigerant evaporator coil 62 of the first evaporator trap 48 is located downstream of the refrigerant condensing coil 42 and is in refrigerant flow commuication with the refrigerant condensing coil 42 through conduit 70. A conventional refrigerant receiver 72, dryer 74 and appropriate thermal expansion valve 76 are also operatively disposed in the conduit 70 between the refrigerant condensing coil 42 and the refrigerant evaporator coil 62. The refrigerant evaporator coil 44 of the cooling means is located downstream of the refrigerant evaporator coil 62 of the first vapor trap 48 and is in refrigerant flow communication with the refrigerant evaporator coil 62 through a refrigerant conduit 78. The refrigerant evaporator coil 62 of the second evaporator trap 50 is located downstream of the refrigerant evaporator coil 44 and is in refrigerant flow communication with the refrigerant evaporator coil 44 through conduit 80. The outlet of refrigerant evaporator coil 62 of the second evaporator trap 50 is in refrigerant flow communication with the low pressure side of the compressor 66 to complete the refrigerant circuit.

The foregoing detailed description is given primarily for clearness of understanding and no unnecessary limitations are to be understood therefrom for modifications will become obvious to those skilled in the art upon reading this disclosure and may be made without departing from the spirit of the invention or scope of the appended claims.

What is claimed is:

1. A vapor generating and recovery apparatus comprising:
   means defining at leat one vaporizing chamber in which a liquid is vaporized;
   heat emitting means located in the vaporizing chamber for heating the liquid to a temperature above the vaporizing temperature to create a vapor zone above the liquid;
   means defining at leat one condensing chamber adjacent to the vaporizing chamber in which the vapor is condensed and separated from the vaporizing chamber by a wall;
   cooling means located in the condensing chamber for cooling the vapor to a temperature below the vaporizing temperature;
   at least one opening in the apparatus providing conveyor inlet and outlet means;
   conveyor means extending through the conveyor inlet into the vaporizing chamber, across the vaporizing chamber, and out of the vaporizing chamber through the conveyor outlet; and
   means defining a path for vapor communication from the vaporizing chamber to the condensing chamber through the wall separating the vaporizing chamber and condensing chamber located laterally to one side of the conveyor means beneath and between said conveyor inlet and outlet means.

2. The apparatus of claim 1, said conveyor inlet means being on the opposite side of said apparatus from said conveyor outlet means.

3. The apparatus of claim 1 further comprising a vapor trap means disposed at said at leat one opening.

4. The apparatus of claim 3 wherein the vapor trap means comprises:
means defining an outer compartment having openings therein for receiving conveyor means therethrough and through which the conveyor means traverses;
means defining an inner compartment totally enclosed within the outer compartment;
means providing for fluid circulation through the inner and outer compartments; and,
cooling means disposed within the trap means for condensing the fluid flowing out of the vaporizing chamber.

5. The apparatus of claim 4 wherein the cooling means of the vapor trap means is located in the outer compartment.

6. The apparatus of claim 4 wherein the means providing for fluid circulation through the inner and outer compartments of the vapor trap means comprises:
a first aperture in the inner compartment defining means providing flow communication between the inner and outer compartments;
a second aperture in the inner compartment defining means at the opposite side of the inner compartment from the first aperture providing flow communication between the inner and outer compartments; and,
means for moving fluid across the outer compartment, through the first aperture, across the inner compartment, and through the second aperture.

7. The apparatus of claim 6 wherein the fluid moving means of the vapor trap means comprises fan means.

8. The apparatus of claim 4, wherein:
the heat emitting means in the vaporized chamber comprises at least one refrigerant condensing coil of a refrigerant system;
the cooling means of the vapor trap means comprises at least one refrigerant evaporator coil of the refrigerant system; and,
the cooling means in the condensing chamber comprises at least one refrigerant evaporator coil of the refrigerant system.

9. The apparatus of claim 1, further comprising:
first trap means located upstream of the conveyor inlet means for capturing and condensing vapor flowing out of the vaporizing chamber through the conveyor inlet means;
second trap means located downstream of the conveyor outlet means for capturing and condensing vapor flowing out of the vaporizing chamber through the conveyor outlet means;
means for returning condensate from the first trap means to the vaporizing chamber; and,
means for returning condensate from the second trap means to the vaporizing chamber.

10. The apparatus of claim 1, wherein the vapor path defining means comprises weir means located at the upper level of the vapor zone in the vaporizing chamber.

11. The apparatus of claim 1, wherein the cooling means in the condensing chamber is located below the vapor path communication means.

12. The apparatus of claim 1 further comprising means for circulating condensate from the condensing chamber to the vaporizing chamber.

13. The apparatus of claim 1, wherein:
the heat emitting means comprises at least one refrigerant condensing coil of a refrigerant system; and,
the cooling means comprises at least one refrigerant evaporator coil of a refrigerant system.

14. The apparatus of claim 1, wherein the at least one condensing chamber includes an opening disposed substantially equi-distance between the conveyor inlet means and the conveyor outlet means.

15. The apparatus of claim 1, wherein the at least one opening in the means defining the vaporizing chamber includes a tunnel through which said conveyor passes.

16. The apparatus of claim 1, wherein the means defining a path for vapor communication from the vaporizing chamber to the condensing chamber includes an opening in said wall separating the vaporizing chamber and condensing chamber above the cooling means in the condensing chamber whereby vapors to be condensed are drawn away from said at least one opening in the housing.

* * * * *